(12) United States Patent
Senerth et al.

(10) Patent No.: US 11,616,522 B1
(45) Date of Patent: Mar. 28, 2023

(54) AIRCRAFT RADIO COMMUNICATION SYSTEM WITH REDUCED NUMBER OF ANTENNAS

(71) Applicant: Gulfstream Aerospace Corporation, Savannah, GA (US)

(72) Inventors: James Senerth, Savannah, GA (US); John Marchetti, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 1 day.

(21) Appl. No.: 17/449,423

(22) Filed: Sep. 29, 2021

(51) Int. Cl.
*H04B 1/3822* (2015.01)

(52) U.S. Cl.
CPC ................. *H04B 1/3822* (2013.01)

(58) Field of Classification Search
CPC .................................................... H04B 1/3822
See application file for complete search history.

(56) References Cited

U.S. PATENT DOCUMENTS

| | | | | |
|---|---|---|---|---|
| 3,825,929 | A * | 7/1974 | Toman | G01S 13/787 342/52 |
| 8,446,323 | B2 * | 5/2013 | Weidmann | H01Q 13/206 343/893 |
| 10,040,576 | B1 * | 8/2018 | Rosenberg | B64D 45/08 |
| 10,422,870 | B2 * | 9/2019 | Mindell | G01S 7/285 |
| 10,450,084 | B2 * | 10/2019 | Murphy | G01S 19/17 |
| 10,591,592 | B2 * | 3/2020 | Mindell | G01S 13/885 |
| 10,633,101 | B2 * | 4/2020 | Negulescu | B64D 27/20 |
| 10,822,118 | B2 * | 11/2020 | Rosenberg | B64D 47/02 |
| 11,342,955 | B2 * | 5/2022 | Welsh | H04B 1/40 |
| 2005/0108374 | A1 * | 5/2005 | Pierzga | H04B 7/18504 709/223 |
| 2012/0081621 | A1 * | 4/2012 | Dorschner | G02F 1/292 349/1 |
| 2012/0242454 | A1 * | 9/2012 | Wyler | H04B 17/14 340/10.1 |
| 2012/0265449 | A1 * | 10/2012 | Ihn | B29C 65/5028 702/33 |
| 2013/0037650 | A1 * | 2/2013 | Heppe | B64C 37/02 244/2 |
| 2015/0015453 | A1 * | 1/2015 | Puzella | H05K 1/0206 333/1.1 |
| 2016/0077027 | A1 * | 3/2016 | Sweers | G01N 27/20 324/654 |
| 2016/0336980 | A1 * | 11/2016 | Allen | H04B 1/3822 |

(Continued)

*Primary Examiner* — Hai V Nguyen
(74) *Attorney, Agent, or Firm* — LKGlobal | Lorenz & Kopf, LLP

(57) ABSTRACT

A radio communication system for a vehicle includes a first radio unit to communicate using a first channel within a designated radio frequency band, a second radio unit to communicate using a second channel within the designated radio frequency band, a common receive antenna shared by the first and second radio units, a signal splitter having a splitter input port coupled to the antenna, a first splitter output port, and a second splitter output port, a first circulator, and a second circulator. The first circulator has an input port coupled to the first splitter output port, an output port coupled to the first radio unit, and a termination port coupled to a matched load. The second circulator has an input port coupled to the second splitter output port, an output port coupled to the second radio unit, and a termination port coupled to a second matched load.

20 Claims, 4 Drawing Sheets

(56) References Cited

U.S. PATENT DOCUMENTS

| | | | | |
|---|---|---|---|---|
| 2016/0363659 | A1* | 12/2016 | Mindell | G01S 13/74 |
| 2017/0257165 | A1* | 9/2017 | Pescod | H04B 10/2575 |
| 2017/0361939 | A1* | 12/2017 | Negulescu | B64C 1/16 |
| 2018/0167644 | A1* | 6/2018 | Frisco | H04N 21/2665 |
| 2018/0170563 | A1* | 6/2018 | Bouchet | B64C 1/061 |
| 2018/0209380 | A1* | 7/2018 | Gallet | F02K 3/065 |
| 2018/0239010 | A1* | 8/2018 | Mindell | G01S 7/352 |
| 2019/0077520 | A1* | 3/2019 | Rosenberg | B64F 1/10 |
| 2019/0361109 | A1* | 11/2019 | Mindell | G01S 11/02 |
| 2019/0385057 | A1* | 12/2019 | Litichever | H04L 63/14 |
| 2020/0070997 | A1* | 3/2020 | Bensmann | B64D 45/0005 |
| 2020/0071003 | A1* | 3/2020 | Bensmann | B64D 45/00 |
| 2020/0160506 | A1* | 5/2020 | Dominguez | G01N 29/4427 |
| 2020/0166607 | A1* | 5/2020 | Jolly | G01S 13/88 |
| 2020/0294401 | A1* | 9/2020 | Kerecsen | G05D 1/0287 |
| 2021/0269173 | A1* | 9/2021 | Rosenberg | B64F 1/228 |
| 2021/0323685 | A1* | 10/2021 | Kupratis | F02K 5/00 |
| 2021/0350237 | A1* | 11/2021 | Litichever | G06N 3/08 |
| 2021/0362871 | A1* | 11/2021 | Pitman | H02J 7/00032 |

* cited by examiner

US 11,616,522 B1

AIRCRAFT RADIO COMMUNICATION SYSTEM WITH REDUCED NUMBER OF ANTENNAS

TECHNICAL FIELD

Embodiments of the subject matter described herein relate generally to radio communication systems. More particularly, embodiments of the subject matter relate to a radio communication system suitable for use onboard a vehicle such as an aircraft.

BACKGROUND

Radio communication systems are deployed onboard vehicles such as aircraft, buses, trains, and watercraft. For example, a typical radio communication system onboard an aircraft supports air-to-air communication, air-to-ground communication, and air-to-satellite communication. An aircraft radio communication system may support various communication bands, including in the very high frequency (VHF) band and/or the ultra high frequency (UHF) band. An aircraft radio communication system may include multiple radio units that provide different and separate communication channels. Accordingly, an aircraft may require a number of transmit antennas and a number of receive antennas to support multiple radio units, depending on the particular configuration of the aircraft, customer requirements, and civil certification requirements. Some aircraft configurations call for physically distinct transmit and receive antennas (rather than combined transmit/receive antennas), which are located external to the aircraft fuselage. For such aircraft configurations, at least two antennas are deployed for each radio unit.

Deploying additional antennas increases aerodynamic drag, requires additional structural reinforcements (for mounting the antennas), increases weight of the aircraft, increases system complexity and cost, and increases manufacturing time.

Accordingly, it is desirable to have a radio communication system (suitable for deployment on an aircraft) having an efficient and practical number of antennas. Furthermore, other desirable features and characteristics will become apparent from the subsequent detailed description and the appended claims, taken in conjunction with the accompanying drawings and the foregoing technical field and background.

BRIEF SUMMARY

A radio communication system for a vehicle, such as an aircraft, is disclosed herein. An exemplary implementation of the system may include: a first radio unit to support radio communication to and from the vehicle using a first channel within a designated radio frequency band; a second radio unit to support radio communication to and from the vehicle using a second channel within the designated radio frequency band; a common receive antenna shared by the first and second radio units; a signal splitter having a splitter input port coupled to the common receive antenna, a first splitter output port, and a second splitter output port; a first circulator having a first circulator input port coupled to the first splitter output port, a first circulator output port coupled to the first radio unit, and a first circulator termination port coupled to a first matched load; and a second circulator having a second circulator input port coupled to the second splitter output port, a second circulator output port coupled to the second radio unit, and a second circulator termination port coupled to a second matched load. The first circulator is configured to isolate the first circulator input port from the first circulator output port. The second circulator is configured to isolate the second circulator input port from the second circulator output port.

Another exemplary implementation of the radio communication system includes: a first radio unit to support radio communication to and from the vehicle; a second radio unit to support radio communication to and from the vehicle; a common transmit and receive antenna shared by the first and second radio units; a first circulator associated with the first radio unit, the first circulator having a first circulator port coupled to the first radio unit, a second circulator port, and a third circulator port; a second circulator associated with the second radio unit, the second circulator having a fourth circulator port coupled to the second radio unit, a fifth circulator port, and a sixth circulator port; a third circulator associated with the common transmit and receive antenna, the third circulator having a seventh circulator port coupled to the common transmit and receive antenna, an eighth circulator port, and a ninth circulator port; a first signal splitter having a first splitter input port coupled to the common transmit and receive antenna via the eighth circulator port of the third circulator, a first splitter output port coupled to the first radio unit via the third circulator port of the first circulator, and a second splitter output port coupled to the second radio unit via the sixth circulator port of the second circulator; and a second signal splitter having a second splitter input port coupled to the first radio unit via the second circulator port of the first circulator, a third splitter input port coupled to the second radio unit via the fifth circulator port of the second circulator, and a third splitter output port coupled to the common transmit and receive antenna via the ninth circulator port of the third circulator.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
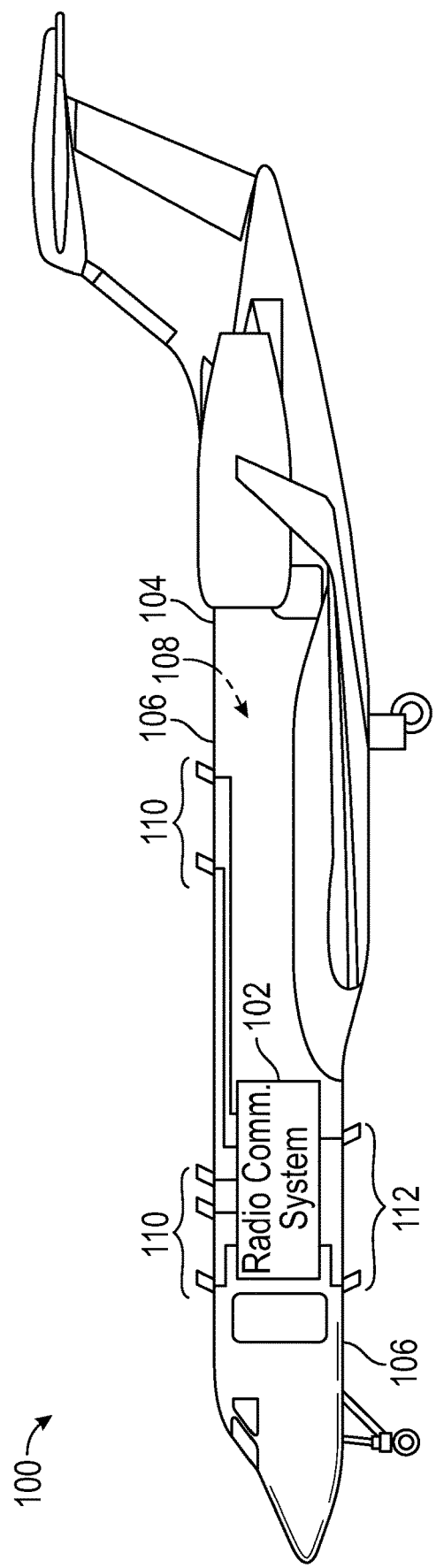
FIG. 1 is a simplified schematic representation of an aircraft having an onboard radio communication system.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components, and with reference to symbolic representations of operations, processing tasks, and functions that may be performed by various components or devices. It should be appreciated that the various block components shown in the figures may be realized by any number of hardware, software, and/or firmware components configured to perform the specified functions.

The following description may refer to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although a schematic diagram might depict one exemplary arrangement of elements, additional intervening elements, devices, features, or components may be present in an embodiment of the depicted subject matter.

In addition, certain terminology may also be used in the following description for the purpose of reference only, and thus are not intended to be limiting. For example, terms such as "upper", "lower", "above", and "below" refer to directions in the drawings to which reference is made. Terms such as "front", "back", "rear", "side", "outboard", and "inboard" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second", and other such numerical terms referring to structures do not imply a sequence or order unless clearly indicated by the context.

A vehicle, such as an aircraft, may include a radio communication system to support multichannel communication. Oftentimes, aircraft customer requirements call for an antenna scheme with split receive and transmit antennas. This effectively doubles the number of antennas needed on the fuselage. By splitting the receive and transmit functionality between two antennas per radio unit, limited fuselage area for installation can constrain the aircraft design. Aerodynamic drag with additional antennas further constrains the design. Structural modification and reinforcements to support additional antennas add to the overall weight and complexity of the aircraft. Increasing the number of radio units, while utilizing separate receive and transmit antennas, further exacerbates these problems. For example, an exemplary implementation of an aircraft radio communication system may include multiple VHF radio units and multiple UHF radio units, each having a devoted transmit antenna and a devoted receive antenna. Consequently, a conventional system having five VHF radio units and two UHF radio units requires fourteen distinct antennas, which is impractical.

It is highly desirable to reduce the complexity and number of components of an onboard radio communication system (to lower manufacturing cost, reduce weight, reduce aerodynamic drag, and simplify the aircraft design). Traditional means of reducing antennas can partially address the problem mentioned above. Two dissimilar radio units (operating on different bands) can typically transmit or receive from a common antenna having two different elements. Thus, VHF and UHF radio units can utilize one antenna component having combined functionality. For the example mentioned above, using combined antenna structures can reduce the number of antennas from fourteen to ten. Although this is an improvement, it may still be impractical and unrealistic to deploy ten antennas on the aircraft fuselage.

A radio communication system arranged in the manner described herein utilizes less antennas than a traditional configuration. The benefits of such an arrangement are particularly notable in the context of a system that employs physically distinct and separated transmit and receive antennas and/or a system that supports different radio frequency bands (e.g., both VHF and UHF bands). The subject matter presented here is configured in a way that further reduces the number of antennas needed to support a radio communication system. The exemplary embodiments described below include the following beneficial features: a series pre-amplifier in the transmission path from each receive antenna; a series splitter after the pre-amplifier, to route the received signal to multiple radio units; a series circulator (configured as an isolator) after the splitter, to prevent reflected power from one radio unit being applied to another radio unit; and retain at least two receive antennas for compliance with certain safety protocols and specifications. Alternatively or additionally, a similar arrangement can be implemented on the transmit side of a radio communication system, to further reduce the number of antennas needed to support the system.

Referring to the drawings, FIG. 1 is a simplified schematic representation of an aircraft 100 having an onboard radio communication system 102. The aircraft 100 has a fuselage 104 with an exterior surface 106. The fuselage 104 surrounds and defines an interior space 108 of the aircraft 100. The radio communication system 102 includes various components (not separately depicted in FIG. 1) located within the interior space 108. The radio communication system 102 also includes a plurality of physically distinct antennas 110, 112 mounted to the exterior surface 106 of the fuselage 104. Although not always required, the illustrated embodiment of the radio communication system 102 includes five transmit antennas 110 located at or near the top of the fuselage 104, and two receive antennas 112 located at or near the bottom of the fuselage 104. Each of the antennas 110, 112 is coupled to at least one other component of the radio communication system 102, as schematically depicted in FIG. 1. Although not shown in FIG. 1, the aircraft 100 includes suitably configured and arranged support structure, reinforcing elements, and/or other components to securely mount and hold the antennas 110, 112 in place. Moreover, the aircraft 100 may include feed-through components or features to accommodate coaxial cables or other transmission lines associated with the antennas 110, 112.

The embodiment depicted in FIG. 1 includes five upper antennas 110 and two lower antennas 112. The upper antennas 110 may be the transmit antennas, and the lower antennas 112 may be the receive antennas. Separate transmit and receive antennas are often used to improve gain and to reduce interference between antennas that operate in the same frequency band. The total number of antennas, the antenna mounting locations, and the number of receive antennas, transmit antennas, and combined antennas may vary from one embodiment to another, depending on customer requirements, aircraft specifications, the number of supported communication channels, and the like. FIG. 1 merely illustrates one potential implementation that encompasses the inventive subject matter described in more detail below.

Figure 2:
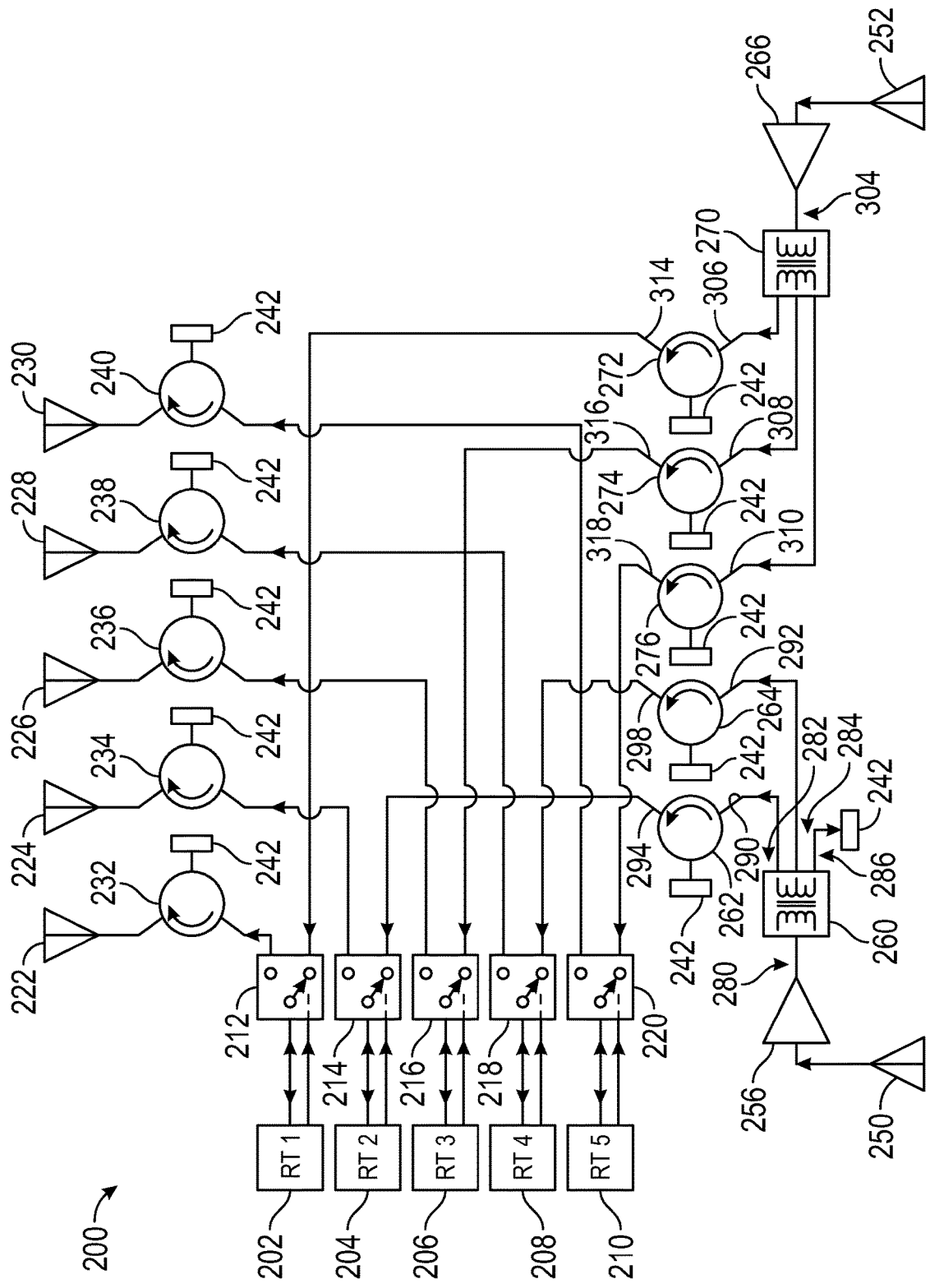
FIG. 2 is a schematic block diagram of an embodiment of a radio communication system suitable for use onboard an aircraft.

FIG. 2 is a schematic block diagram of an exemplary embodiment of a radio communication system 200 suitable for use onboard a vehicle, such as an aircraft. The radio communication system 200 represents one implementation of the radio communication system 102 shown in FIG. 1. The illustrated embodiment of the radio communication system 200 includes five different radio units (labeled with reference numbers 202, 204, 206, 208, and 210). Each radio unit is designed, configured, and implemented in a conventional manner to support radio frequency (RF) transmitter and receiver functions as required for commercial aircraft. Although not always required, the five radio units operate on the same RF frequency band (e.g., VHF or UHF), but each radio unit communicates on a separate, different, non-overlapping RF channel within the designated RF band. In certain implementations, for example, the radio communication system 200 supports RF communication on five different VHF channels.

Each radio unit can be operated in a transmit mode or a receive mode to support radio communication to and from the aircraft. Accordingly, each radio unit includes or cooperates with a respective push-to-talk (PTT) switch (which are labeled with reference numbers 212, 214, 216, 218, and 220). As shown in FIG. 2, a first radio unit 202 includes or is coupled to a first PTT switch 212, a second radio unit 204 includes or is coupled to a second PTT switch 214, a third radio unit 206 includes or is coupled to a third PTT switch 216, a fourth radio unit 208 includes or is coupled to a fourth PTT switch 218, and a fifth radio unit 210 includes or is coupled to a fifth PTT switch 220. In FIG. 2, the double-headed arrow between a radio unit and a PTT switch represents the RF signal path, which may be realized by a length of coaxial cable coupled between the radio unit and a PTT radio port. In FIG. 2, the single-headed arrow between a radio unit and a PTT switch represents the PTT control signal. The PTT control signal changes the state of the PTT switch (as needed) for operation in the talk/transmit mode or the listen/receive mode. In a typical implementation, the user presses and holds a button to talk, which activates the PTT control signal, which in turn places the PTT switch into the talk/transmit mode. When the user releases the button, the PTT control signal changes state (or is simply removed), which causes the PTT switch to change state into the listen/receive mode.

In accordance with the illustrated embodiment, each radio unit has its own transmit antenna, which is mounted to an exterior surface of the fuselage. In this regard, the first radio unit 202 is coupled to a first transmit antenna 222, the second radio unit 204 is coupled to a second transmit antenna 224, the third radio unit 206 is coupled to a third transmit antenna 226, the fourth radio unit 208 is coupled to a fourth transmit antenna 228, and the fifth radio unit 210 is coupled to a fifth transmit antenna 230. Each transmit antenna is coupled to an output port (which is associated with its respective radio unit) by way of at least one circulator. To this end, a first circulator 232 is coupled between a PTT output port of the first PTT switch 212 and an input of the first transmit antenna 222, a second circulator 234 is coupled between a PTT output port of the second PTT switch 214 and an input of the second transmit antenna 224, a third circulator 236 is coupled between a PTT output port of the third PTT switch 216 and an input of the third transmit antenna 226, a fourth circulator 238 is coupled between a PTT output port of the fourth PTT switch 218 and an input of the fourth transmit antenna 228, and a fifth circulator 240 is coupled between a PTT output port of the fifth PTT switch 220 and an input of the fifth transmit antenna 230.

Each of the circulators 232, 234, 236, 238, 240 is configured and arranged to function as an isolator having a desired amount of isolation (typically measured in decibels). In certain implementations, a circulator can be realized with two or more isolator components arranged in series to achieve the desired amount of isolation. For example, two 20 dB isolator components can be arranged in series to obtain 40 dB of isolation. For the simplified embodiment shown in FIG. 2, the output port of a PTT switch is coupled to a circulator input port, the input of a transmit antenna is coupled to a circulator output port, and a matched load 242 (e.g., a 50 ohm termination) is coupled to a circulator termination port. When arranged in this manner, each of the circulators 232, 234, 236, 238, 240 transmits the RF signal (obtained from the radio unit) from its circulator input port to the circulator output port, and inhibits transmission of RF energy from the circulator output port to the circulator input port. The circulators ensure that reflected RF power does not feed back into the radio units, which can damage or adversely affect operation of the radio units.

The illustrated embodiment of the radio communication system 200 includes a common receive antenna 250 shared by at least two radio units, and another common receive antenna 252 shared by at least two radio units. More specifically, the common receive antenna 250 is shared by the second radio unit 204 and the fourth radio unit 208, and the common receive antenna 252 is shared by the first radio unit 202, the third radio unit 206, and the fifth radio unit 210. The common receive antennas 250, 252 can be mounted to the exterior surface of the fuselage. In certain embodiments, the transmit antennas are located on top of the fuselage, and the common receive antennas 250, 252 are located on the bottom of the fuselage. As shown in FIG. 2, the first radio unit 202 is coupled to the common receive antenna 252, the second radio unit 204 is coupled to the common receive antenna 250, the third radio unit 206 is coupled to the common receive antenna 252, the fourth radio unit 208 is coupled to the common receive antenna 250, and the fifth radio unit 210 is coupled to the common receive antenna 252. For the depicted implementation, each radio unit is coupled to only one of the common receive antennas 250, 252.

The radio communication system 200 includes at least the following components, which are associated with the common receive antenna 250: a preamplifier 256; a signal splitter 260; and two circulators 262, 264. The radio communication system 200 also includes at least the following components, which are associated with the common receive antenna 252: a preamplifier 266; a signal splitter 270; and three circulators 272, 274, 276. Other than the antennas, which are mounted to the exterior surface of the fuselage, all of the components depicted in FIG. 2 are located within the interior space of the fuselage.

The common receive antenna 250 is coupled to the input of the preamplifier 256, such that the RF signal received by the common receive antenna 250 can be amplified as needed by the preamplifier 256. The signal splitter 260 depicted in FIG. 2 is a three-way splitter having three splitter output ports 282, 284, 286. The splitter output port 282 is coupled to the circulator input port 290 of the circulator 262, the splitter output port 284 is coupled to the circulator input port 292 of the circulator 264, and the splitter output port 286 is coupled to a matched load 242 (e.g., a 50 ohm termination).

As an alternative, a two-way signal splitter can be used (without a matched load 242) instead of the three-way signal splitter 260 shown in FIG. 2.

The circulator 262 includes a circulator output port 294 that is coupled to the second radio unit 204 via the second PTT switch 214. More specifically, the circulator output port 294 is coupled to a PTT input port of the second PTT switch 214 such that the second radio unit 204 can receive RF signals from the common receive antenna 250. The circulator 262 also has a circulator termination port that is coupled to a matched load 242 (e.g., a 50 ohm termination). When configured and arranged in this manner, the circulator 262 isolates its circulator input port 290 from its circulator output port 294. In this regard, the circulator 262 transmits the RF signal (provided at the splitter output port 282) from its circulator input port 290 to its circulator output port 294, and inhibits transmission of RF energy from its circulator output port 294 to its circulator input port 290. The circulator 262 ensures that reflected RF power does not feed back into the radio units, which can damage or adversely affect operation of the radio units. In certain embodiments, the circulator 262 is implemented with two or more isolator components in series to obtain the desired amount of isolation.

The circulator 264 includes a circulator output port 298 that is coupled to the fourth radio unit 208 via the fourth PTT switch 218. More specifically, the circulator output port 298 is coupled to a PTT input port of the fourth PTT switch 218 such that the fourth radio unit 208 can receive RF signals from the common receive antenna 250. The circulator 264 also has a circulator termination port that is coupled to a matched load 242 (e.g., a 50 ohm termination). When configured and arranged in this manner, the circulator 264 isolates its circulator input port 292 from its circulator output port 298. In this regard, the circulator 264 transmits the RF signal (provided at the splitter output port 284) from its circulator input port 292 to its circulator output port 298, and inhibits transmission of RF energy from its circulator output port 298 to its circulator input port 292. The circulator 264 ensures that reflected RF power does not feed back into the radio units, which can damage or adversely affect operation of the radio units. In certain embodiments, the circulator 264 is implemented with two or more isolator components in series to obtain the desired amount of isolation.

The signal splitter 260 enables sharing of the RF signal from the common receive antenna 250—the RF signal is split for sharing by the second radio unit 204 and the fourth radio unit 208. The preamplifier 256 is coupled between the common receive antenna 250 and the circulators 262, 264 to amplify signals provided by the common receive antenna 250. In this regard, the preamplifier 256 amplifies the received RF signal to compensate for attenuation caused by the signal splitter 260. The embodiment shown in FIG. 2 employs a single preamplifier 256 coupled between the common receive antenna 250 and the splitter input port 280. Alternatively or additionally, an embodiment could utilize a preamplifier coupled between the splitter output port 282 and the circulator input port 290 of the circulator 262, and/or a preamplifier coupled between the splitter output port 284 and the circulator input port 292 of the circulator 264.

The common receive antenna 252 is coupled to the input of the preamplifier 266, such that the RF signal received by the common receive antenna 252 can be amplified as needed by the preamplifier 266. The signal splitter 270 is a three-way splitter having three splitter output ports. One splitter output port is coupled to the circulator input port 306 of the circulator 272, another splitter output port is coupled to the circulator input port 308 of the circulator 274, and another splitter output port is coupled to the circulator input port 310 of the circulator 276. FIG. 2 depicts an embodiment that can be implemented with common "off the shelf" components, such as three-way splitters. Alternatively, an equivalent arrangement can use two-way splitters, a five-way splitter, etc.

The circulator 272 includes a circulator output port 314 that is coupled to the first radio unit 202 via the first PTT switch 212. More specifically, the circulator output port 314 is coupled to a PTT input port of the first PTT switch 212 such that the first radio unit 202 can receive RF signals from the common receive antenna 252. The circulator 272 also has a circulator termination port that is coupled to a matched load 242 (e.g., a 50 ohm termination). When configured and arranged in this manner, the circulator 272 functions as an isolator, as described above. In certain embodiments, the circulator 272 is implemented with two or more isolator components in series to obtain the desired amount of isolation.

The circulator 274 includes a circulator output port 316 that is coupled to the third radio unit 206 via the third PTT switch 216. More specifically, the circulator output port 316 is coupled to a PTT input port of the third PTT switch 216 such that the third radio unit 206 can receive RF signals from the common receive antenna 252. The circulator 274 also has a circulator termination port that is coupled to a matched load 242 (e.g., a 50 ohm termination). When configured and arranged in this manner, the circulator 274 functions as an isolator, as described above. In certain embodiments, the circulator 274 is implemented with two or more isolator components in series to obtain the desired amount of isolation.

The circulator 276 includes a circulator output port 318 that is coupled to the fifth radio unit 210 via the fifth PTT switch 220. More specifically, the circulator output port 318 is coupled to a PTT input port of the fifth PTT switch 220 such that the fifth radio unit 210 can receive RF signals from the common receive antenna 252. The circulator 276 also has a circulator termination port that is coupled to a matched load 242 (e.g., a 50 ohm termination). When configured and arranged in this manner, the circulator 276 functions as an isolator, as described above. In certain embodiments, the circulator 276 is implemented with two or more isolator components in series to obtain the desired amount of isolation.

The signal splitter 270 enables sharing of the RF signal from the common receive antenna 252—the RF signal is split for sharing by the first radio unit 202, the third radio unit 206, and the fifth radio unit 210. The preamplifier 266 is coupled between the common receive antenna 252 and the circulators 272, 274, 276 to amplify signals provided by the common receive antenna 252. In this regard, the preamplifier 266 amplifies the received RF signal to compensate for attenuation caused by the signal splitter 270. The embodiment shown in FIG. 2 employs a single preamplifier 266 coupled between the common receive antenna 252 and the splitter input port 304. Alternatively or additionally, an embodiment could utilize a preamplifier coupled between a splitter output port and the corresponding circulator input port if so desired.

The PTT switches and PTT functionality were described above with reference to the transmit antennas and the transmit signal paths. As mentioned above, each PTT switch 212, 214, 216, 218, 220 has a PTT radio port coupled to its associated radio unit, and a PTT output port coupled to an associated circulator input port. In addition, each PTT switch 212, 214, 216, 218, 220 has a PTT input port coupled to an associated circulator output port. More specifically: the PTT input port of the PTT switch 212 is coupled to the circulator output port 314 of the circulator 272; the PTT input port of the PTT switch 214 is coupled to the circulator output port 294 of the circulator 262; the PTT input port of the PTT switch 216 is coupled to the circulator output port 316 of the circulator 274; the PTT input port of the PTT switch 218 is coupled to the circulator output port 298 of the circulator 264; and the PTT input port of the PTT switch 220 is coupled to the circulator output port 318 of the circulator 276.

Figure 3:
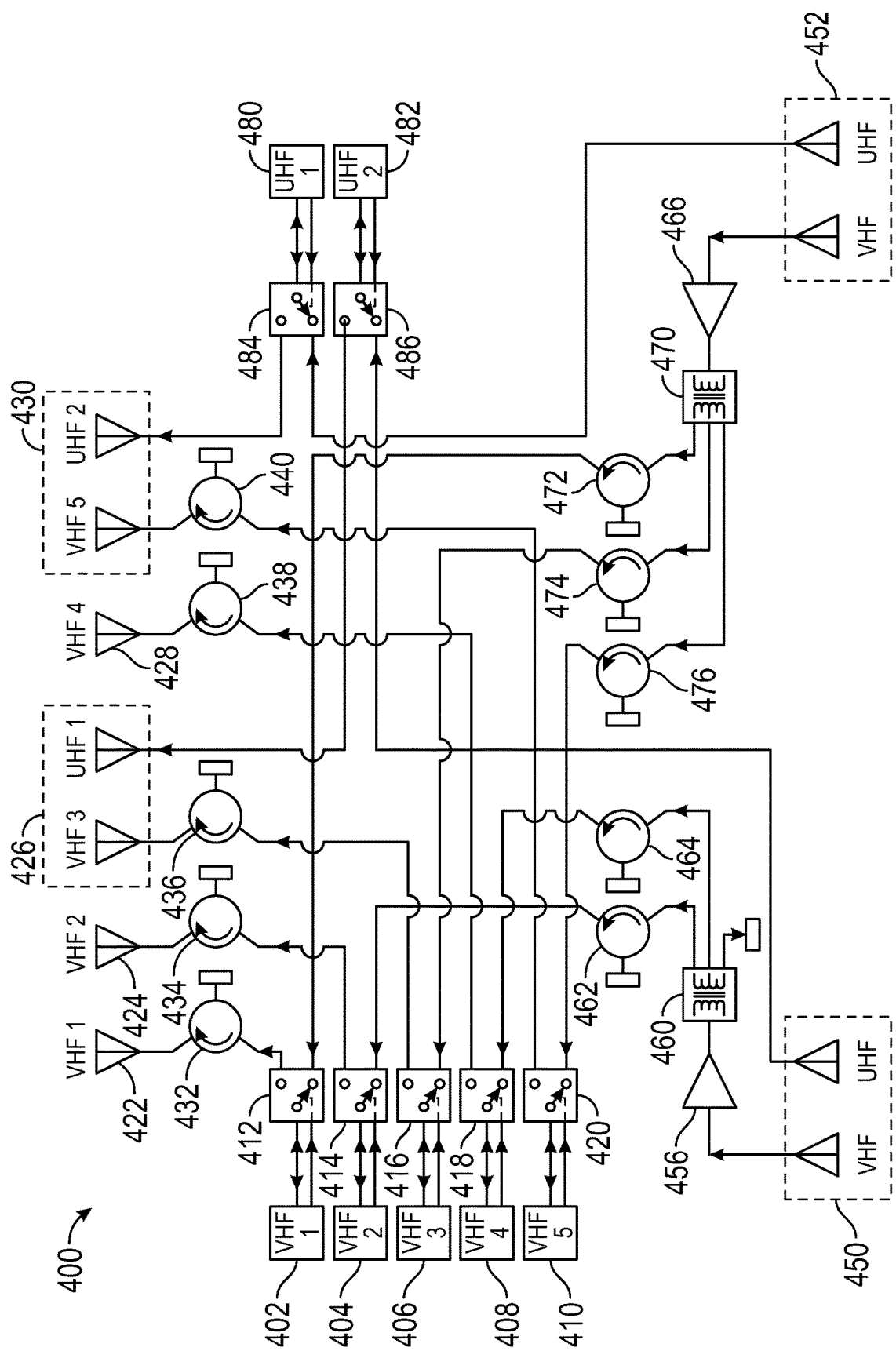
FIG. 3 is a schematic block diagram of another embodiment of a radio communication system suitable for use onboard an aircraft.

As mentioned above, the antennas of the radio communication system 200 can be mounted to an exterior surface of the fuselage, and the remaining components of the radio communication system 200 can be located within an interior space of the fuselage. In certain embodiments, the transmit antennas 222, 224, 226, 228, 230 are mounted at or near the top of the fuselage, and the common receive antennas 250, 252 are mounted at or near the bottom of the fuselage. The radio communication system 200 is suitable for use as a single band system, wherein the radio units and the antennas are configured and operated to support multiple channels within the same RF frequency band. For example, the radio communication system 200 may be a VHF system, a UHF system, etc. In practice, however, it may be desirable or necessary to deploy a multiband radio communication system to support a plurality of different RF frequency bands, e.g., both VHF and UHF. Accordingly, the radio communication system 200 can be modified to include at least one additional radio unit that operates on a separate RF frequency band, and to include additional antennas and related components to support communication using the different RF frequency band. In this regard, FIG. 3 is a schematic block diagram of an embodiment of a multiband radio communication system 400 suitable for use onboard a vehicle, such as an aircraft.

The illustrated embodiment of the radio communication system 400 includes, without limitation: a plurality of VHF radio units (labeled with reference numbers 402, 404, 406, 408, and 410); PTT switches (labeled with reference numbers 412, 414, 416, 418, and 420) corresponding to the VHF radio units; transmit antennas (labeled with reference numbers 422, 424, 426, 428, and 430) for the VHF radio units; circulators (labeled with reference numbers 432, 434, 436, 438, and 440) associated with the transmit antennas; and common receive antennas 450, 452, each of which is shared by at least two of the VHF radio units. The radio communication system 400 also includes at least the following components, which are associated with the common receive antenna 450: a preamplifier 456; a signal splitter 460; and two circulators 462, 464. The radio communication system 400 also includes at least the following components, which are associated with the common receive antenna 452: a preamplifier 466; a signal splitter 470; and three circulators 472, 474, 476. The radio communication system 400 also includes at least the following components: a plurality of UHF radio units 480, 482; and PTT switches 484, 486 corresponding to the UHF radio units.

The radio communication system 400 includes a number of components and elements that are identical, similar, or equivalent to counterpart items found in the radio communication system 200, and such items will not be redundantly described in detail here. In this regard, the following items are arranged to operate as described above with reference to FIG. 2: VHF radio units 402, 404, 406, 408, 410; PTT switches 412, 414, 416, 418, 420; transmit antennas 422, 424, 428; circulators 432, 434, 436, 438, 440; preamplifier 456; signal splitter 460; circulators 462, 464; preamplifier 466; signal splitter 470; and circulators 472, 474, 476.

Although not always required, the transmit antennas 426, 430 and the common receive antennas 450, 452 are implemented using multiband antennas. A multiband antenna is realized as one hardware component that incorporates a plurality of radio elements to receive and/or transmit RF signals in different frequency bands. For this particular embodiment, each of the antennas 426, 430, 450, 452 includes a housing or a shell, a VHF antenna element, a UHF antenna element, a VHF signal port for the VHF antenna element, and a UHF signal port for the UHF antenna element. In FIG. 3, the boxes in dashed lines represent the housing or shell of a multiband antenna, and each box contains a VHF antenna element and a UHF antenna element. Accordingly, the multiband transmit antenna 426 includes a VHF transmit antenna element (labeled VHF 3) and a UHF transmit antenna element (labeled UHF 1), the multiband transmit antenna 430 includes a VHF transmit antenna element (labeled VHF 5) and a UHF transmit antenna element (labeled UHF 2), the common multiband receive antenna 450 includes a VHF receive antenna element and a UHF receive antenna element, and the common multiband receive antenna 452 includes a VHF receive antenna element and a UHF receive antenna element.

The VHF transmit antenna element of the multiband transmit antenna 426 is coupled to one port of the circulator 436, and the PTT output port of the PTT switch 416 is coupled to another port of the circulator 436. This arrangement allows the third VHF radio unit 406 to transmit RF signals via the multiband transmit antenna 426. Similarly, the VHF transmit antenna element of the multiband transmit antenna 430 is coupled to one port of the circulator 440, and the PTT output port of the PTT switch 420 is coupled to another port of the circulator 440. This arrangement allows the fifth VHF radio unit 410 to transmit RF signals via the multiband transmit antenna 430.

The UHF transmit antenna element of the multiband transmit antenna 426 is coupled to the PTT output port of the PTT switch 486 (without a preamplifier, a signal splitter, or a circulator in the RF signal path). This arrangement allows the second UHF radio unit 482 to transmit RF signals via the multiband transmit antenna 426. Similarly, the UHF transmit antenna element of the multiband transmit antenna 430 is coupled to the PTT output port of the PTT switch 484 (without a preamplifier, a signal splitter, or a circulator in the RF signal path). This arrangement allows the first UHF radio unit 480 to transmit RF signals via the multiband transmit antenna 430. The UHF signal paths need not include preamplifiers, signal splitters, or circulators because each UHF radio unit 480, 482 has a devoted UHF transmit antenna element and a devoted UHF receive antenna element. Accordingly, the UHF signal paths need not be split or shared.

The VHF receive antenna element of the common multiband receive antenna 450 is coupled to the input of the preamplifier 456. This arrangement allows the second VHF radio unit 404 to receive RF signals from the common multiband receive antenna 450, via the path that includes the preamplifier 456, the signal splitter 460, and the circulator 462. This arrangement also allows the fourth VHF radio unit 408 to receive RF signals from the common multiband receive antenna 450, via the path that includes the preamplifier 456, the signal splitter 460, and the circulator 464. Similarly, the VHF receive antenna element of the common multiband receive antenna 452 is coupled to the input of the preamplifier 466. This arrangement allows: (1) the first VHF radio unit 402 to receive RF signals from the common multiband receive antenna 452, via the path that includes the preamplifier 466, the signal splitter 470, and the circulator 472; (2) the third VHF radio unit 406 to receive RF signals from the common multiband receive antenna 450, via the path that includes the preamplifier 466, the signal splitter 470, and the circulator 474; and (3) the fifth VHF radio unit 410 to receive RF signals from the common multiband receive antenna 450, via the path that includes the preamplifier 466, the signal splitter 470, and the circulator 476.

The UHF receive antenna element of the common multiband receive antenna 450 is coupled to the PTT input port of the PTT switch 486 (without a circulator in the RF signal path). This arrangement allows the second UHF radio unit 482 to receive RF signals via the common multiband receive antenna 450. Similarly, the UHF receive antenna element of the common multiband receive antenna 452 is coupled to the PTT input port of the PTT switch 484 (without a circulator in the RF signal path). This arrangement allows the first UHF radio unit 480 to receive RF signals via the common multiband receive antenna 452.

The exemplary configuration of the radio communication system 400 reduces the number of physically distinct antenna structures by combining VHF and UHF antenna elements, and by sharing those antenna structures with a plurality of distinct radio units. Although not utilized by the arrangement shown in FIG. 2, a UHF receive antenna (or a receive antenna element within a multiband antenna structure) could be shared by a plurality of UHF radio units in the manner described above for the common VHF receive antennas.

The arrangements shown in FIG. 2 and FIG. 3 include at least one common receive antenna, which can be shared by a plurality of different radio units. Additionally, or alternatively, a radio communication system may include at least one common transmit antenna, which can be shared by a plurality of different radio units. In this regard, the transmit signal paths can incorporate preamplifiers, signal splitters/combiners, circulators, switches, and the like.

The radio communication systems 200, 400 employ separate transmit and receive antennas, which allows the transmit antennas to be mounted on the top of the fuselage and the receive antennas to be mounted on the bottom of the fuselage. In alternative deployments where physical separation of the transmit and receive antennas is not required, a single transmit/receive antenna structure can be arranged with an appropriate number of preamplifiers, splitters/combiners, and circulators to support a plurality of distinct radio units. Moreover, a multiband transmit/receive antenna structure can be arranged to support any number of VHF radio units and any number of UHF radio units. Indeed, certain embodiments may include only one antenna component to support transmit and receive functions for multiple radio units. In accordance with some embodiments, the techniques and arrangements described above can be utilized to obtain a radio communication system that supports transmit and receive functions without using any PTT switches.

As mentioned above, a radio communication system of the type described herein may employ physically distinct transmit and receive antennas. Alternatively, certain embodiments of the radio communication system may be suitably designed, configured, and deployed for use with one or more antennas that perform both transmit and receive functions. In this regard, FIG. 4 is a schematic block diagram of an embodiment of a radio communication system 600 that includes a common transmit and receive antenna that is shared by a plurality of radio units.

The illustrated embodiment of the radio communication system 600 includes, without limitation: a plurality of different radio units (e.g., a first radio unit 602 and a second radio unit 604), each configured and operated to support radio communication to and from the host vehicle; a common transmit and receive antenna 610 that can be shared by two or more radio units; a first signal splitter 612, which is located in a receive signal path; a second signal splitter 614, which is located in a transmit signal path; and circulators (labeled with reference numbers 620, 622, 624, 628, 630, 636, and 638). The illustrated embodiment of the radio communication system 600 also includes at least the following components, without limitation: a receive signal preamplifier 644 for the receive signal path; a transmit signal preamplifier 646 for the transmit signal path; a shunt filter 650 for the receive signal path; and a number of matched loads 652 (e.g., 50 ohm terminations).

Figure 4:
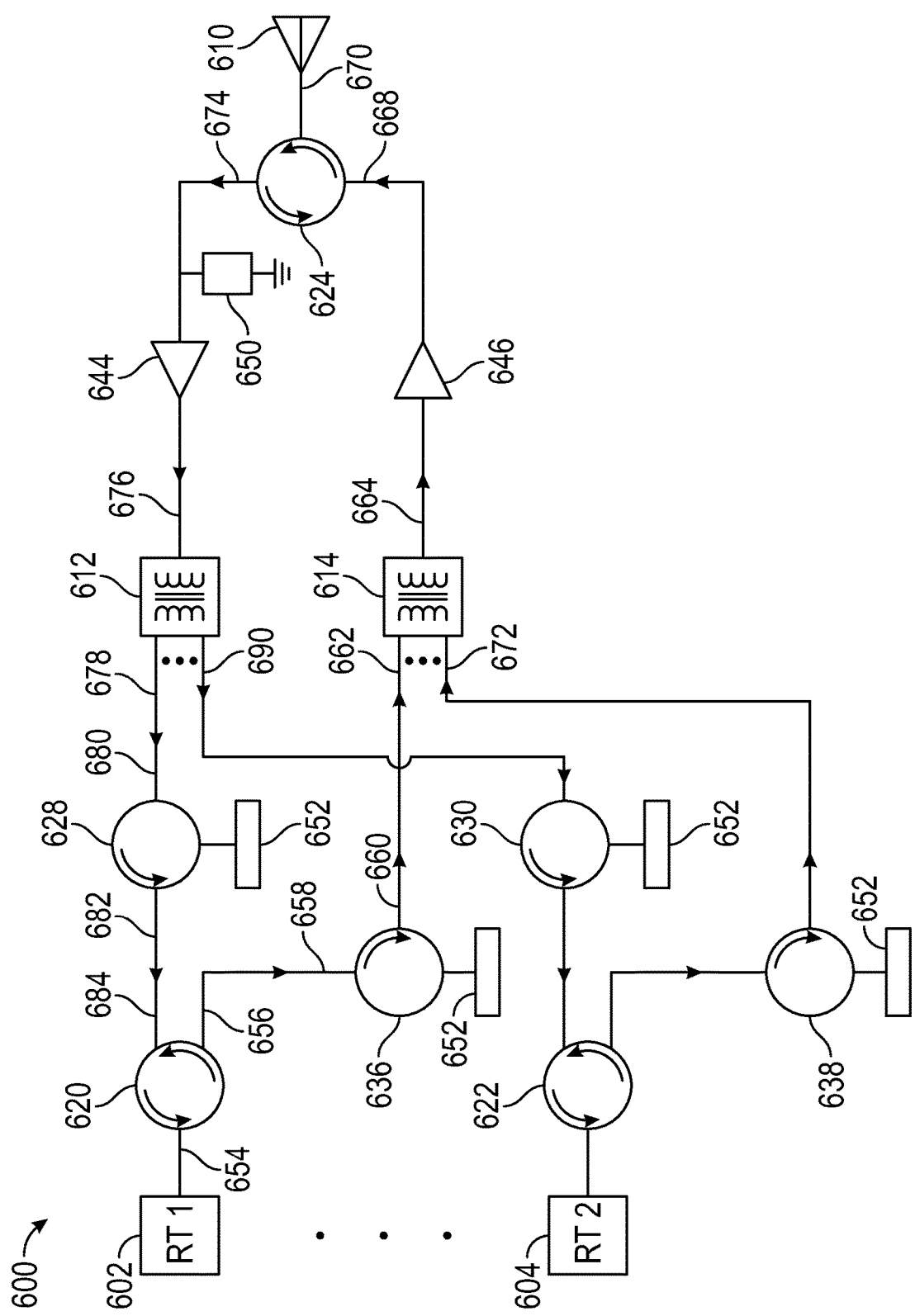
FIG. 4 is a schematic block diagram of another embodiment of a radio communication system suitable for use onboard an aircraft.

Although FIG. 4 only depicts two radio units, the radio communication system 600 can be modified to support more than two radio units, as indicated by the ellipses in FIG. 4. To this end, N-way signal splitters (and/or additional signal splitter components) and more circulators can be added to the radio communication system 600 as needed to accommodate additional radio units. The radio communication system 600 includes a number of components and elements that are identical, similar, or equivalent to counterpart items found in the radio communication system 200, and such items will not be redundantly described in detail here.

The first radio unit 602 transmits and receives signals using different frequencies within a designated frequency band, e.g., the VHF band. Likewise, the second radio unit 604 transmits and receives signals using different frequencies within the designated frequency band. The common transmit and receive antenna 610 supports both radio units 602, 604. Thus, the common transmit and receive antenna 610 is coupled to both radio units 602, 604 via respective transmit signal paths and via respective receive signal paths. The circulator 620 enables the first radio unit 602 to transmit and receive simultaneously (using different frequencies) without a push-to-talk switch. Likewise, circulator 622 enables the second radio unit 604 to transmit and receive simultaneously (using different frequencies) without a push-to-talk switch.

The transmit signal path from the first radio unit 602 to the common transmit and receive antenna 610 includes, without limitation: the circulator 620 (including its circulator input/output port 654 and its circulator output port 656); the circulator 636 (including its circulator input port 658 and its circulator output port 660); the second signal splitter 614 (including its splitter input port 662 and its splitter output port 664); the transmit signal preamplifier 646; and the circulator 624 (including its circulator input port 668 and its circulator input/output port 670). Similarly, the transmit signal path from the second radio unit 604 to the common transmit and receive antenna 610 includes, without limitation: the circulator 622 (including its circulator input/output port and its circulator output port); the circulator 638 (including its circulator input port and its circulator output port); the second signal splitter 614 (including its splitter input port 672 and its splitter output port 664); the transmit signal preamplifier 646; and the circulator 624 (including its circulator input port 668 and its circulator input/output port 670).

The receive signal path from the common transmit and receive antenna 610 to the first radio unit 602 includes, without limitation: the circulator 624 (including its circulator input/output port 670 and its circulator output port 674); the receive signal preamplifier 644; the first signal splitter 612 (including its splitter input port 676 and its splitter output port 678); the circulator 628 (including its circulator input port 680 and its circulator output port 682); and the circulator 620 (including its circulator input port 684 and its circulator input/output port 654). The shunt filter 650 may also be considered to be part of this receive signal path. Similarly, the receive signal path from the common transmit and receive antenna 610 to the second radio unit 604 includes, without limitation: the circulator 624 (including its circulator input/output port 670 and its circulator output port 674); the receive signal preamplifier 644; the first signal splitter 612 (including its splitter input port 676 and its splitter output port 690); the circulator 630 (including its circulator input port and its circulator output port); and the circulator 622 (including its circulator input port and its circulator input/output port). The shunt filter 650 may also be considered to be part of this receive signal path.

The circulator 620 is associated with the first radio unit 602. The input/output interface of the first radio unit 602 is coupled to the circulator input/output port 654 of the circulator 620. The circulator input port 684 of the circulator 620 serves as an input for received signals, and the circulator output port 656 of the circulator 620 serves as an output for transmitted signals. The circulator 620 passes transmit signal power of the first radio unit 602 from the circulator input/output port 654 to the circulator output port 656. The circulator 620 passes receive signal power from the circulator input port 684 to the circulator input/output port 654. The circulator 620 is configured and arranged to isolate transmit signal power from receive signal power. This allows the first radio unit 602 to transmit and receive signals in a concurrent manner.

As mentioned above, the circulator 636 resides in the transmit signal path of the first radio unit 602. The circulator input port 658 of the circulator 636 is coupled to the circulator output port 656 of the circulator 620. The circulator output port 660 of the circulator 636 is coupled to the splitter input port 662 of the second signal splitter 614. Another circulator output port of the circulator 636 is coupled to a matched load 652 (e.g., a 50 ohm termination). When configured and arranged in this manner, the circulator 636 isolates its circulator input port 658 from its circulator output port 660, transmits the RF signal from its circulator input port 658 to its circulator output port 660, and inhibits transmission of RF energy from its circulator output port 660 to its circulator input port 658.

As shown in FIG. 4, the second signal splitter 614 resides in the transmit signal paths of both radio units 602, 604. To this end, the splitter input port 662 of the second signal splitter 614 is coupled to the first radio unit 602 via a portion of the transmit signal path that includes: the circulator 620 (including its circulator input/output port 654 and its circulator output port 656); and the circulator 636 (including its circulator input port 658 and its circulator output port 660). The splitter input port 672 of the second signal splitter 614 is coupled to the second radio unit 604 via a portion of the transmit signal path that includes: the circulator 622 (including its circulator input/output port and its circulator output port); and the circulator 638 (including its circulator input port and its circulator output port). The splitter output port 664 of the second signal splitter is coupled to the common transmit and receive antenna 610 via a portion of the transmit signal path that includes: the transmit signal preamplifier 646; and the circulator 624 (including its circulator input port 668 and its circulator input/output port 670). The transmit signal preamplifier 646 has an input coupled to the splitter output port 664, and has an output coupled to the circulator input port 668 of the circulator 624. The transmit signal preamplifier 646 amplifies transmit signals (i.e., the output of the second signal splitter 614) to an appropriate level that is suitable for transmission via the common transmit and receive antenna 610.

The circulator 624 is associated with the common transmit and receive antenna 610 and is associated with both radio units 602, 604. The circulator input/output port 670 of the circulator 624 is coupled to the common transmit and receive antenna 610 such that signals from the transmit signal paths are transmitted from the common transmit and receive antenna 610, and such that signals received at the common transmit and receive antenna 610 are provided to the receive signal paths. The circulator 624 passes receive signal power from the common transmit and receive antenna 610 to the circulator output port 674. The circulator 624 passes transmit signal power from the circulator input port 668 to the circulator input/output port 670. The circulator 624 is configured and arranged to isolate transmit signal power from receive signal power. This allows the common transmit and receive antenna 610 to transmit and receive signals in a concurrent manner.

Referring to the receive signal paths, the circulator output port 674 of the circulator 624 is coupled to the input of the receive signal preamplifier 644. The output of the receive signal preamplifier 644 is coupled to the splitter input port 676 of the first signal splitter 612. The receive signal preamplifier 644 is coupled between the common transmit and receive antenna 610 and the first signal splitter 612 to amplify signals received signals to compensate for attenuation caused by the first signal splitter 612.

For the illustrated embodiment, the shunt filter 650 is coupled to the circulator output port 674 of the circulator 624 and is also coupled to the input of the receive signal preamplifier 644. More specifically, the shunt filter 650 is coupled between the circulator output port 674 and a reference potential (e.g., ground). The shunt filter 650 is arranged and configured to shunt transmit signal power leaked from the circulator 624. Ideally, the circulator 624 totally isolates transmit signal power from the circulator output port 674. In practice, however, a small amount of transmit signal power may pass into the receive signal path. The shunt filter 650 is designed to reduce the effect of any leaked transmit signal power.

The splitter output port 678 of the first signal splitter 612 is coupled to the first radio unit 602, and the splitter output port 690 of the first signal splitter 612 is coupled to the second radio unit 604. As depicted in FIG. 4, the splitter output port 678 is coupled to the first radio unit 602 via a portion of the receive signal path that includes: the circulator 628 and the circulator 620 (including its circulator input port 684 and its circulator input/output port 654).

The circulator input port 680 of the circulator 628 is coupled to the splitter output port 678 of the first signal splitter 612. The circulator output port 682 of the circulator 628 is coupled to the circulator input port 684 of the circulator 620. Another circulator output port of the circulator 628 is coupled to a matched load 652 (e.g., a 50 ohm termination). When configured and arranged in this manner, the circulator 628 isolates its circulator input port 680 from its circulator output port 682, transmits RF signals from its circulator input port 680 to its circulator output port 682, and inhibits transmission of RF energy from its circulator output port 682 to its circulator input port 680.

The transmit and receive signal paths corresponding to the first radio unit 602 were described in detail above with reference to FIG. 4. The system 600 includes similar transmit and receive signal paths corresponding to the second radio unit 604, and these signal paths may be arranged with the same component topology, layout, and configuration described above in the context of the signal paths for the first radio unit 602. Accordingly, the transmit and receive signal paths corresponding to the second radio unit 604 will not be redundantly described here. Furthermore, it should be appreciated that additional components, arranged in a similar manner, can be included in an embodiment of the system 600 to accommodate more than two radio units.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A radio communication system for a vehicle, including aircraft, the radio communication system comprising:
   a first radio unit to support radio communication to and from the vehicle using a first channel within a designated radio frequency band;
   a second radio unit to support radio communication to and from the vehicle using a second channel within the designated radio frequency band;
   a common receive antenna shared by the first and second radio units;
   a signal splitter comprising a splitter input port coupled to the common receive antenna, a first splitter output port, and a second splitter output port;
   a first circulator comprising a first circulator input port coupled to the first splitter output port, a first circulator output port coupled to the first radio unit, and a first circulator termination port coupled to a first matched load, the first circulator configured to isolate the first circulator input port from the first circulator output port; and
   a second circulator comprising a second circulator input port coupled to the second splitter output port, a second circulator output port coupled to the second radio unit, and a second circulator termination port coupled to a second matched load, the second circulator configured to isolate the second circulator input port from the second circulator output port.

2. The radio communication system of claim 1, wherein: the vehicle is an aircraft having a fuselage;
   the common receive antenna is mounted to an exterior surface of the fuselage; and
   the first radio unit, the second radio unit, the signal splitter, the first circulator, and the second circulator are located within an interior space of the fuselage.

3. The radio communication system of claim 1, further comprising at least one preamplifier coupled between the common receive antenna and the first and second circulators.

4. The radio communication system of claim 3, wherein the at least one preamplifier comprises a single preamplifier coupled between the common receive antenna and the splitter input port, the single preamplifier operational to amplify signals provided by the common receive antenna.

5. The radio communication system of claim 1, further comprising:
   a first transmit antenna coupled to an output port associated with the first radio unit; and
   a second transmit antenna coupled to an output port associated with the second radio unit.

6. The radio communication system of claim 5, further comprising:
   a third circulator comprising a third circulator input port coupled to the output port associated with the first radio unit, a third circulator output port coupled to the first transmit antenna, and a third circulator termination port coupled to a third matched load; and
   a fourth circulator comprising a fourth circulator input port coupled to the output port associated with the second radio unit, a fourth circulator output port coupled to the second transmit antenna, and a fourth circulator termination port coupled to a fourth matched load.

7. The radio communication system of claim 6, further comprising:
   a first push-to-talk (PTT) switch comprising a first PTT radio port coupled to the first radio unit, a first PTT input port coupled to the first circulator output port, and a first PTT output port coupled to the third circulator input port, wherein the first PTT output port corresponds to the output port associated with the first radio unit; and
   a second PTT switch comprising a second PTT radio port coupled to the second radio unit, a second PTT input port coupled to the second circulator output port, and a second PTT output port coupled to the fourth circulator input port, wherein the second PTT output port corresponds to the output port associated with the second radio unit.

8. An aircraft comprising the radio communication system of claim 1.

9. The aircraft of claim 8, wherein:
   the aircraft comprises a fuselage;
   the common receive antenna is mounted to an exterior surface of the fuselage; and
   the first radio unit, the second radio unit, the signal splitter, the first circulator, and the second circulator are located within an interior space of the fuselage.

10. The aircraft of claim 8, further comprising at least one preamplifier coupled between the common receive antenna and the first and second circulators.

11. The aircraft of claim 10, wherein the at least one preamplifier comprises a single preamplifier coupled between the common receive antenna and the splitter input port, the single preamplifier operational to amplify signals provided by the common receive antenna.

12. The aircraft of claim 8, further comprising:
   a first transmit antenna coupled to an output port associated with the first radio unit; and
   a second transmit antenna coupled to an output port associated with the second radio unit.

13. The aircraft of claim 12, further comprising:
   a third circulator comprising a third circulator input port coupled to the output port associated with the first radio unit, a third circulator output port coupled to the first transmit antenna, and a third circulator termination port coupled to a third matched load; and a fourth circulator comprising a fourth circulator input port coupled to the output port associated with the second radio unit, a fourth circulator output port coupled to the second transmit antenna, and a fourth circulator termination port coupled to a fourth matched load.

14. The aircraft of claim 13, further comprising:

a first push-to-talk (PTT) switch comprising a first PTT radio port coupled to the first radio unit, a first PTT input port coupled to the first circulator output port, and a first PTT output port coupled to the third circulator input port, wherein the first PTT output port corresponds to the output port associated with the first radio unit; and a second PTT switch comprising a second PTT radio port coupled to the second radio unit, a second PTT input port coupled to the second circulator output port, and a second PTT output port coupled to the fourth circulator input port, wherein the second PTT output port corresponds to the output port associated with the second radio unit.

15. A radio communication system for a vehicle, including aircraft, the radio communication system comprising:

a first radio unit to support radio communication to and from the vehicle;

a second radio unit to support radio communication to and from the vehicle;

a common transmit and receive antenna shared by the first and second radio units;

a first circulator associated with the first radio unit, the first circulator comprising a first circulator port coupled to the first radio unit, a second circulator port, and a third circulator port;

a second circulator associated with the second radio unit, the second circulator comprising a fourth circulator port coupled to the second radio unit, a fifth circulator port, and a sixth circulator port;

a third circulator associated with the common transmit and receive antenna, the third circulator comprising a seventh circulator port coupled to the common transmit and receive antenna, an eighth circulator port, and a ninth circulator port;

a first signal splitter comprising a first splitter input port coupled to the common transmit and receive antenna via the eighth circulator port of the third circulator, a first splitter output port coupled to the first radio unit via the third circulator port of the first circulator, and a second splitter output port coupled to the second radio unit via the sixth circulator port of the second circulator; and a second signal splitter comprising a second splitter input port coupled to the first radio unit via the second circulator port of the first circulator, a third splitter input port coupled to the second radio unit via the fifth circulator port of the second circulator, and a third splitter output port coupled to the common transmit and receive antenna via the ninth circulator port of the third circulator.

16. The radio communication system of claim 15, further comprising:

a fourth circulator comprising a tenth circulator port coupled to the first splitter output port of the first signal splitter, an eleventh circulator port coupled to the third circulator port of the first circulator, and a twelfth circulator port coupled to a first matched load, the fourth circulator configured to isolate the tenth circulator port from the eleventh circulator port; and a fifth circulator comprising a thirteenth circulator port coupled to the second splitter output port of the first signal splitter, a fourteenth circulator port coupled to the sixth circulator port of the second circulator, and a fifteenth circulator port coupled to a second matched load, the fifth circulator configured to isolate the thirteenth circulator port from the fourteenth circulator port.

17. The radio communication system of claim 16, further comprising:

a sixth circulator comprising a sixteenth circulator port coupled to the second circulator port of the first circulator, a seventeenth circulator port coupled to the second splitter input port of the second signal splitter, and an eighteenth circulator port coupled to a third matched load, the sixth circulator configured to isolate the sixteenth circulator port from the seventeenth circulator port; and a seventh circulator comprising a nineteenth circulator port coupled to the fifth circulator port of the second circulator, a twentieth circulator port coupled to the third splitter input port of the second signal splitter, and a twenty-first circulator port coupled to a fourth matched load, the seventh circulator configured to isolate the nineteenth circulator port from the twentieth circulator port.

18. The radio communication system of claim 15, further comprising:

a receive signal preamplifier having an input coupled to the eighth circulator port of the third circulator, and having an output coupled to the first splitter input port of the first signal splitter; and a transmit signal preamplifier having an input coupled to the third splitter output port of the second signal splitter, and having an output coupled to the ninth circulator port of the third circulator.

19. The radio communication system of claim 15, further comprising a shunt filter coupled to the eighth circulator port of the third circulator, the shunt filter configured to shunt transmit signal power leaked from the third circulator.

20. The radio communication system of claim 15, wherein:

the first circulator passes transmit signal power of the first radio unit, from the first circulator port to the second circulator port;

the first circulator passes receive signal power from the third circulator port to the first circulator port;

the second circulator passes transmit signal power of the second radio unit, from the fourth circulator port to the fifth circulator port; and the second circulator passes receive signal power from the sixth circulator port to the fourth circulator port.

\* \* \* \* \*